United States Patent
Giroux et al.

(10) Patent No.: US 10,489,200 B2
(45) Date of Patent: Nov. 26, 2019

(54) HIERARCHICAL STAGING AREAS FOR SCHEDULING THREADS FOR EXECUTION

(71) Applicant: NVIDIA CORPORATION, Santa Clara, CA (US)

(72) Inventors: Olivier Giroux, San Jose, CA (US); Jack Hilaire Choquette, Palo Alto, CA (US); Robert J. Stoll, Los Altos, CA (US); Xiaogang Qiu, San Jose, CA (US); Michael Alan Fetterman, Boxborough, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 226 days.

(21) Appl. No.: 14/061,170

(22) Filed: Oct. 23, 2013

(65) Prior Publication Data
US 2015/0113538 A1    Apr. 23, 2015

(51) Int. Cl.
*G06F 9/50*    (2006.01)

(52) U.S. Cl.
CPC ...... *G06F 9/5011* (2013.01); *G06F 2209/507* (2013.01)

(58) Field of Classification Search
None
See application file for complete search history.

(56) References Cited

U.S. PATENT DOCUMENTS

| | | | | |
|---|---|---|---|---|
| 6,105,053 A * | 8/2000 | Kimmel | ............... | G06F 9/5016 718/102 |
| 6,493,741 B1 * | 12/2002 | Emer | ................... | G06F 9/30087 710/200 |
| 6,496,925 B1 * | 12/2002 | Rodgers | ................ | G06F 9/3851 710/262 |
| 7,526,634 B1 * | 4/2009 | Duluk, Jr. | ................. | G06F 9/52 712/216 |
| 7,624,107 B1 * | 11/2009 | Le Grand | ................. | G06F 7/24 |
| 2004/0078420 A1 * | 4/2004 | Marrow | .................. | G06F 9/468 709/201 |
| 2010/0169253 A1 * | 7/2010 | Tan | ....................... | G06F 9/5088 706/21 |
| 2012/0110586 A1 * | 5/2012 | Coon | .................... | G06F 9/4881 718/102 |
| 2013/0074088 A1 * | 3/2013 | Purcell | .................... | G06F 9/461 718/103 |
| 2013/0086582 A1 * | 4/2013 | Cardona | ................. | H04L 69/12 718/1 |

\* cited by examiner

*Primary Examiner* — Sisley N Kim
(74) *Attorney, Agent, or Firm* — Artegis Law Group, LLP

(57) ABSTRACT

One embodiment of the present invention is a computer-implemented method for scheduling a thread group for execution on a processing engine that includes identifying a first thread group included in a first set of thread groups that can be issued for execution on the processing engine, where the first thread group includes one or more threads. The method also includes transferring the first thread group from the first set of thread groups to a second set of thread groups, allocating hardware resources to the first thread group, and selecting the first thread group from the second set of thread groups for execution on the processing engine. One advantage of the disclosed technique is that a scheduler only allocates limited hardware resources to thread groups that are, in fact, ready to be issued for execution, thereby conserving those resources in a manner that is generally more efficient than conventional techniques.

24 Claims, 6 Drawing Sheets

HIERARCHICAL STAGING AREAS FOR SCHEDULING THREADS FOR EXECUTION

BACKGROUND OF THE INVENTION

Field of the Invention

The present invention generally relates to multithreaded programming and, more specifically, to hierarchical staging areas for scheduling threads for execution.

Description of the Related Art

A conventional multi-threaded processor supports the concurrent execution of multiple different threads. For example, single-instruction, multiple-data (SIMD) instruction issue techniques could be used to support parallel execution of a large number of threads without providing multiple independent instruction units. Alternatively, single-instruction, multiple-thread (SIMT) techniques could be used to support parallel execution of a large number of generally synchronized threads, using a common instruction unit configured to issue instructions to a set of processing engines.

Conventional multi-threaded processors include a scheduler that is configured to allocate hardware resources to each thread or group of threads on the multithreaded processor, and to then select threads to be issued for execution. The hardware resources could include, for example, space in random access memory (RAM) for instructions, execution bandwidth within an execution pipeline, and other hardware resources needed for execution.

Once the hardware resources have been allocated to each thread or thread group, the scheduler arbitrates between those entities and selects one or more to be issued for execution. The scheduler performs this process iteratively in order to issue multiple threads or groups of threads for execution. In general, the scheduler has a limited time window within which to arbitrate between the threads and select threads or thread groups to be issued. Upon execution, the threads rely on the allocated hardware resources to perform various processing tasks.

The above approach provides reasonable efficiency when the number of thread groups is low, such as, e.g., 16, as is common with conventional multi-threaded processors. However, more advanced multi-threaded processors may support a much larger number of thread groups, such as, e.g., 64. With that many threads groups, two main problems arise.

First, the amount of hardware resources allocated to the thread groups must be scaled in proportion to the number of thread groups. For example, the amount of RAM space allocated across thread groups could grow linearly with the number of groups, meaning that the addition of thread groups would necessitate a corresponding increase in RAM space. Second, the size of the scheduler must be scaled in proportion to the number of thread groups. For example, the transistor budget for the scheduler could grow linearly with the number of thread groups (or other entities competing for scheduling) on the multithreaded processor, meaning that the scheduling for a larger pool of thread groups would require a concordant increase in transistor cost for a fixed thread group size.

As the foregoing illustrates, what is needed in the art is a more effective technique for scheduling larger numbers of thread groups for execution on a multithreaded processor.

SUMMARY OF THE INVENTION

One embodiment of the present invention includes a computer-implemented method for scheduling a thread group for execution on a processing engine, including identifying a first thread group included in a first set of thread groups that can be issued for execution on the processing engine, where the first thread group includes one or more threads, transferring the first thread group from the first set of thread groups to a second set of thread groups, allocating hardware resources to the first thread group, and selecting the first thread group from the second set of thread groups for execution on the processing engine.

One advantage of the disclosed technique is that a scheduler only allocates limited hardware resources to thread groups that are, in fact, ready to be issued for execution, thereby conserving those resources in a manner that is generally more efficient than conventional techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
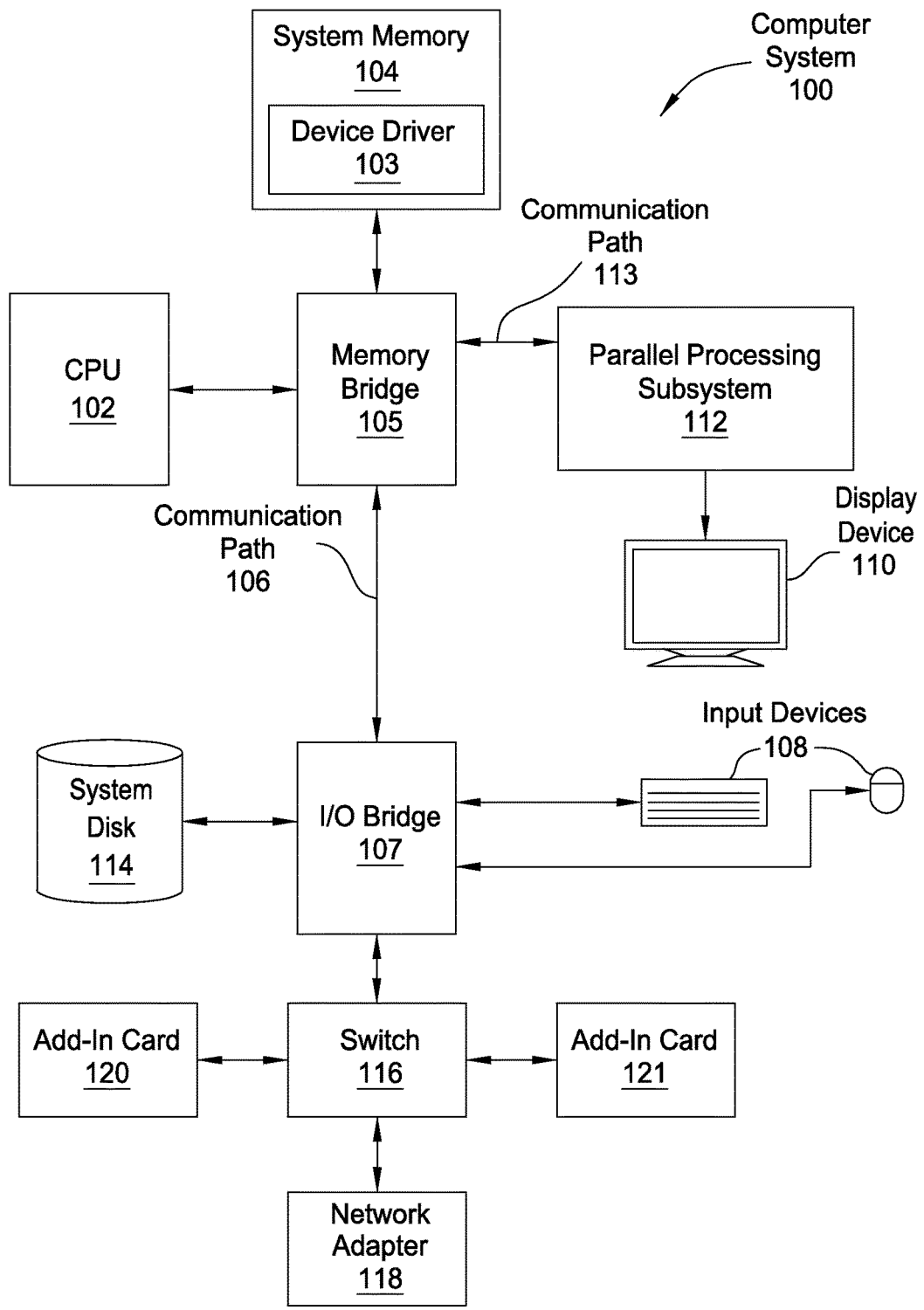
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
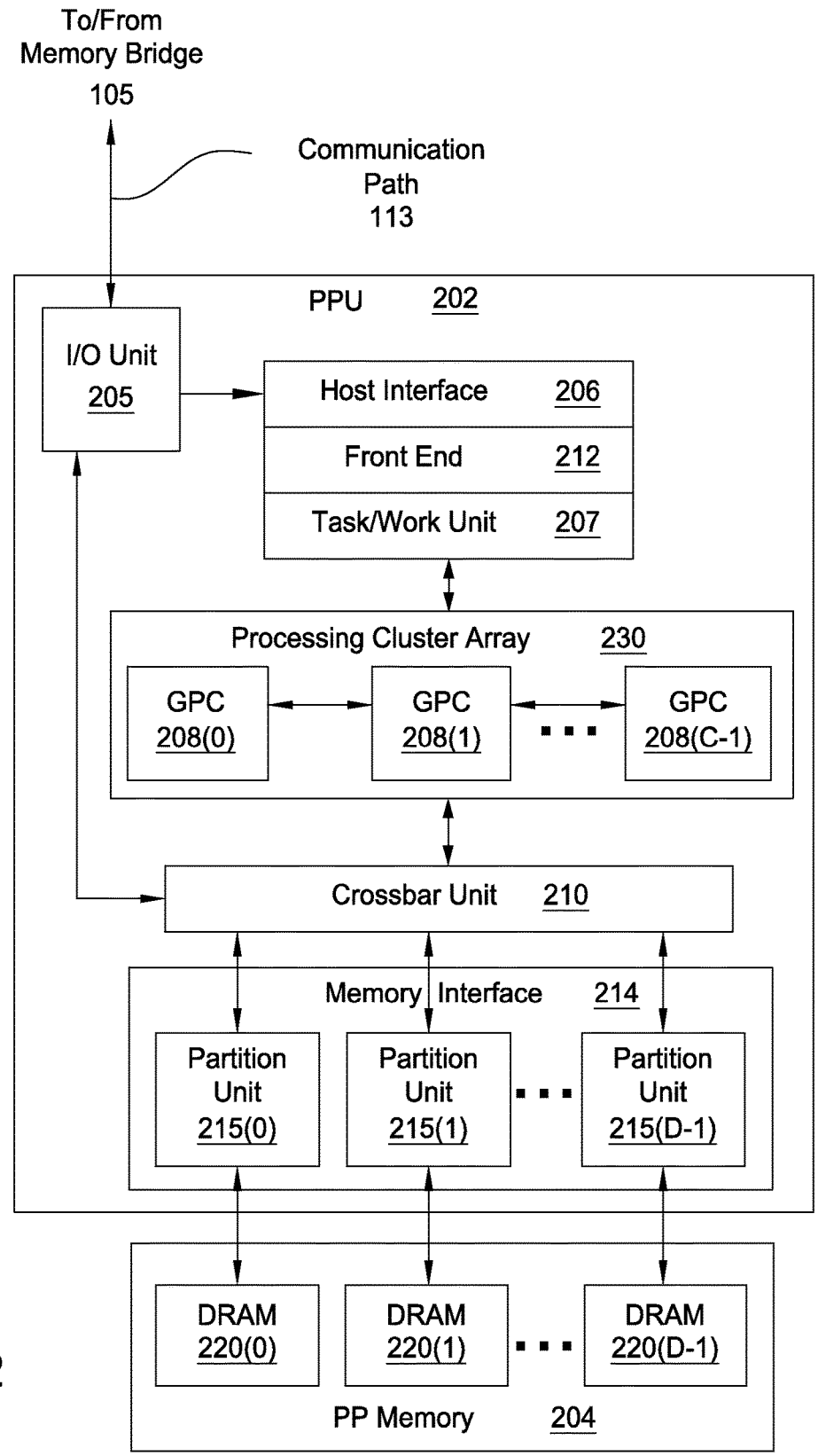
FIG. 2 is a block diagram of a parallel processing subsystem for the computer system of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
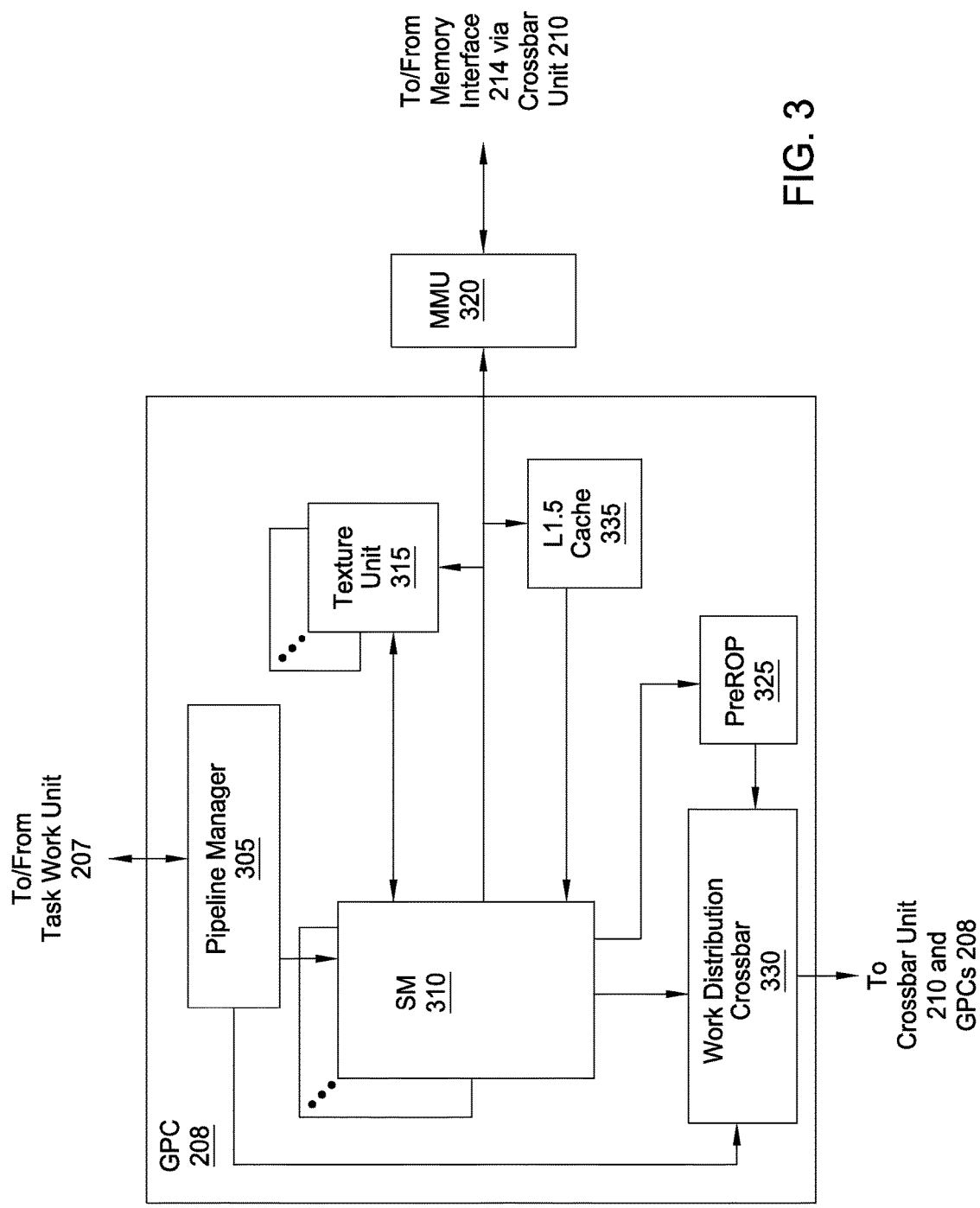
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Hierarchical Scheduling of Threads for Execution

SM 310 discussed above in conjunction with FIG. 3 is configured to support the parallel execution of many different thread groups. Those thread groups may exist in varying phases of execution. For example, one thread group could be stalled while waiting for a long-latency operation, such as, e.g., a load instruction, a texture operation, etc. Another thread group could be active and waiting to be issued for execution. Yet another thread group could be executing instructions on an execution pipeline within SM 310.

SM 310 includes a scheduler that is configured to arrange the different thread groups associated with SM 310 into different sets based on the different phases associated with those thread groups. A first set is designated to include thread groups that are not yet ready to issue for execution. A second set is designated for thread groups that are, in fact, ready to issue for execution. The scheduler is configured to place thread groups into these different sets according to a long term scheduling (macro-scheduling policy). The scheduler then selects a thread group to issue, from within the second set, based on a short term scheduling (micro-scheduling) policy, as described in greater detail below in conjunction with FIGS. 4-6.

Figure 4:
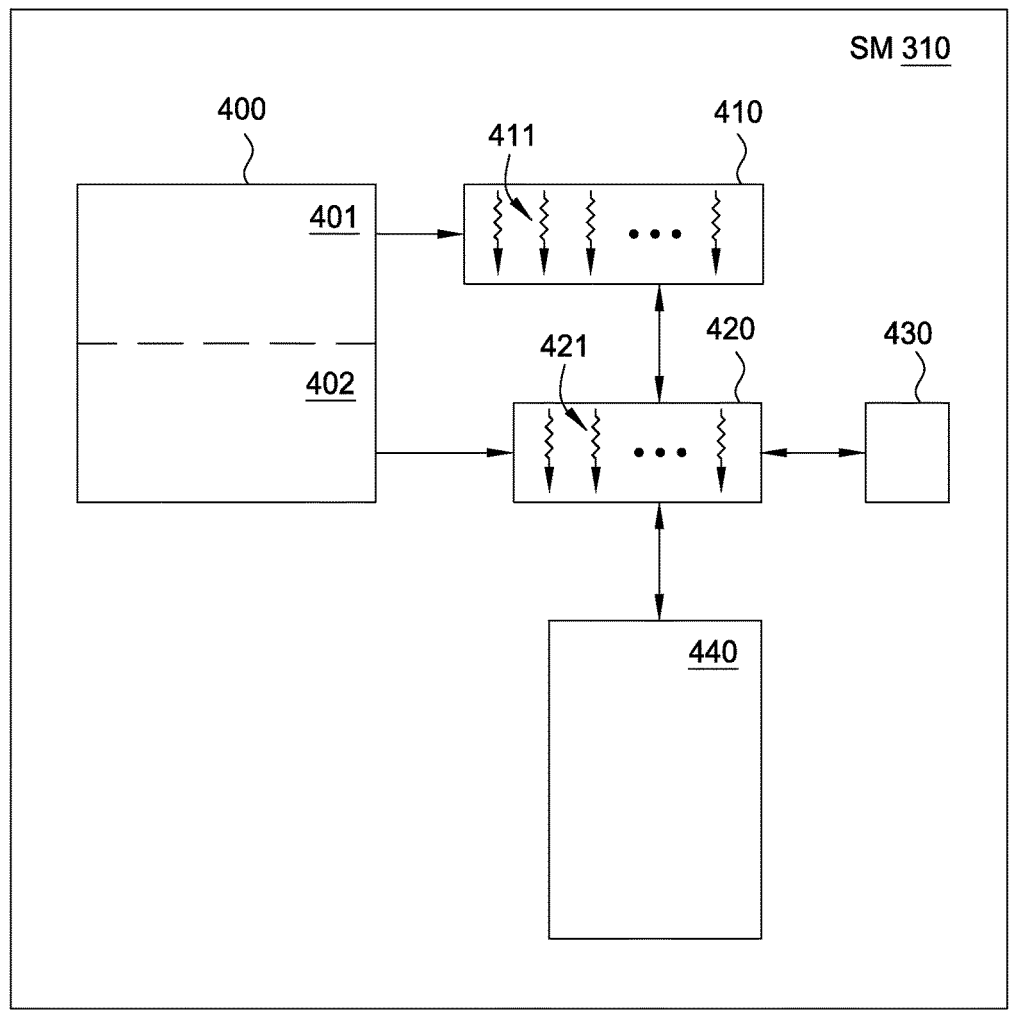
FIG. 4 is a block diagram of a streaming multiprocessor included in the general processing cluster of FIG. 3, according to one embodiment of the present invention.

FIG. 4 is a conceptual diagram of SM 310 included in GPC 208 of FIG. 3, according to one embodiment of the present invention. As shown, SM 310 includes a scheduler 400 that includes a macro-scheduler 401 and a micro-scheduler 402. Scheduler 400 is coupled to a pre-staging area 410 and to a staging area 420. Pre-staging area 410 includes thread groups 411 and is coupled to staging area 420. Staging area 420 includes thread groups 421 and is coupled to hardware resources 430 and execution pipeline 440. A given thread group within thread groups 411 and 421 may include one or more threads.

In the context of this disclosure, pre-staging area 410 and staging area 420 represent conceptual abstractions referred to herein to distinguish between different sets to which different thread groups may belong. Pre-staging area 410 and staging area 420 may be implemented by hardware constructs configured to manage thread groups 410 and 420 separately, or, alternatively, software constructs configured to denote to which area each thread group belongs As a general matter, the staging areas discussed below may be implemented by any combination of hardware and software elements configured to support the hierarchical scheduling techniques described herein.

Scheduler 400 is a hardware unit configured to schedule thread groups associated with SM 310 to be issued for execution on execution pipeline 440. In doing so, scheduler 400 arranges those thread groups into pre-staging area 410 and staging area 420. Pre-staging area 410 may include thread groups that are not yet ready for execution. Staging area 420 may include thread groups that are, in fact, ready for execution. As a general matter, pre-staging area 410 includes more thread groups than staging area 420. Further, staging area 420 can only manage a limited number of thread groups. Accordingly, scheduler 400 may, in practice, arrange some thread groups that are ready to issue into pre-staging area 410 until other thread groups can be issued from staging area 420 for execution on execution pipeline 440. Execution pipeline 440 may include any number of execution units, load-store units, memory elements, and so forth.

Scheduler 400 is configured to place a given thread group into either pre-staging area 410 or staging area 420 based on a macro-scheduling policy that is discussed in greater detail below. In one embodiment, macro scheduler 401 implements the macro-scheduling policy. Scheduler 400 is also configured to issue a given thread group within staging area 420 for execution on execution pipeline 440 based on a micro-scheduling policy that is also discussed in greater detail below. In one embodiment, micro scheduler 401 implements the micro-scheduling policy. When scheduler 400 places a thread group into staging area 420 based on the micro-scheduling policy, scheduler 400 allocates hardware resources to that thread group. Hardware resources 430 may include instruction buffers implemented by flops, temporary registers, and other limited hardware resources associated with SM 310. When scheduler 400 issues a thread group for execution on execution pipeline 440, the thread group relies on hardware resources 430 to perform various execution-related tasks.

Scheduler 400 may implement a wide variety of different macro-scheduling policies in order to arrange the thread groups associated with SM 310 into pre-staging area 410 and staging area 420. For example, scheduler 400 could analyze dependencies associated with each thread group, and then identify thread groups that depend on the completion of long-latency operations that are currently in progress. Scheduler 400 would then determine that the identified thread groups are not yet ready for execution, and then place those thread groups into pre-staging area 410. The thread groups within pre-staging area 410 need not have access to hardware resources 430, since those thread groups are not yet ready to issue. Scheduler 400 would also place the remaining thread groups (those which do not depend on the completion of long-latency instructions) into staging area 420 and then allocate hardware resources 430 to those thread groups. Scheduler 400 may also analyze dependencies and identify thread groups that depend on the completion of medium-latency operations. Scheduler 400 may or may not place such thread groups into staging area 420, depending on the macro-scheduling policy.

Scheduler 400 may also rely on software hints when arranging the thread groups associated with SM 310 into pre-staging area 410 and staging area 420. For example, a given thread group could implement a "yield" instruction that would cause scheduler 400 to place that thread group into pre-staging area 410 and de-allocate hardware resources 430 from that thread group. The thread group could issue the yield instruction upon determining that a long-latency operation has just been initiated, and the thread group cannot proceed until that operation completes. Similarly, a given thread group could implement a "hold" instruction that would cause scheduler 400 to keep that thread group in staging area 420 and allow the thread group to retain hardware resources 430. The thread group could issue the hold instruction upon determining that a medium-latency batch of work is in progress and should not be interrupted.

Scheduler 400 may also place multiple thread groups into staging area 420 together based on coherency between those thread groups. For example, if scheduler 400 determines that two thread groups include memory operations that target similar data, scheduler 400 could place both of those thread groups into staging area 420, allocate hardware resources 430 to those thread groups, and then cause those thread groups to be issued for execution on execution pipeline 440 at similar times. When performing the memory operations mentioned above, one of the thread groups may cache data that is needed by the other thread group. In this fashion, executing coherent thread groups together may improve cache efficiency. If scheduler 400 determines that coherency between two or more thread groups in staging area 420 has been lost, scheduler 400 may remove some or all of those thread groups from staging area 420 to pre-staging area 410.

When implementing the macro-scheduling policy, scheduler 400 may shuttle thread groups between pre-staging area 410 and staging area 420 continuously and, in doing so, continuously allocate and de-allocate hardware resources 430 to and from those thread groups. With this approach, scheduler 400 need only allocate hardware resources 430 to the subset of thread groups associated with SM 310 that are, in fact, ready to issue, thereby allocating those resources more efficiently compared to prior art techniques. Additionally, since hardware resources 430 are implemented by flops, as mentioned above, the power efficiency and latency of those resources is improved over the RAM-based resources of the prior art.

Scheduler 400 may implement a wide variety of different micro-scheduling policies in order to select a thread group from within staging area 420 to issue for execution of execution pipeline 440. For example, scheduler 400 could implement a fairness-based approach to equalize the forward progress of different thread groups so that each one of those thread groups may achieve a similar level of progress. Scheduler 400 could also implement, as part of the micro-scheduling policy, a "hold" instruction that preferentially keeps certain thread groups within staging area 420. Alternatively, scheduler 400 could implement a coherency-based approach in order to preferentially issue coherent thread groups before issuing thread groups that are not coherent. With the unique architecture described herein, scheduler 400 need only select a thread group to issue for execution from a subset of thread groups associated with SM 310. Accordingly, scheduler 400 need only be sized to perform arbitration between the number of threads supported by staging area 420 in order to identify a thread group to issue for execution.

Persons skilled in the art will appreciate that the thread groups described in conjunction with FIG. 4 may perform a wide variety of different processing operations. Those operations may include including graphics operations, such as pixel shader programs, vertex shader programs and so forth, as well as general compute operations. Persons skilled in the art will further recognize that a scheduler may arrange thread groups into any number of different sets that correspond to different levels of staging. The various techniques described thus far for scheduling thread groups for execution are also described below, in stepwise fashion, in conjunction with FIGS. 5-6.

Figure 5:
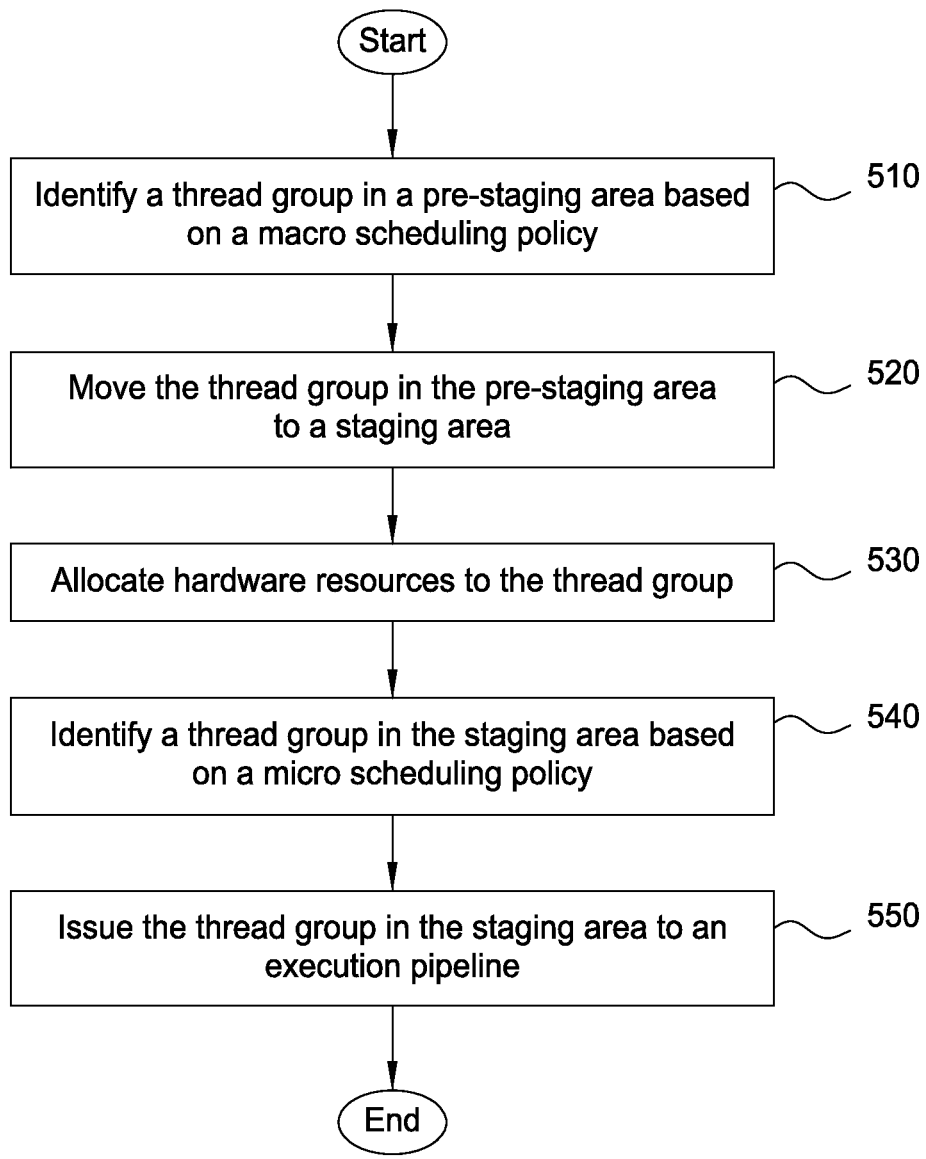
FIG. 5 is a flow diagram of method steps for scheduling a group of threads for execution on a streaming multiprocessor, according to one embodiment of the present invention.

FIG. 5 is a flow diagram of method steps for scheduling a group of threads for execution on a streaming multiprocessor, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 510, where scheduler 400 identifies a thread group in pre-staging area 410 based on the macro scheduling policy. Scheduler 400 may identify the thread group at step 510 as being ready to be issued for execution. Scheduler 400 could, for example, analyze dependencies associated with the thread group and determine that the thread group does not depend on any long-latency operations. Alternatively, scheduler 400 could determine that instructions associated with the thread group indicate that the thread group should be issued for execution as soon as possible.

At step 520, scheduler 400 moves the thread group from pre-staging area 410 to staging area 420. Whereas pre-staging area 410 includes thread groups that may not yet ready for execution, staging area 420, on the other hand, includes thread groups that may, in fact, be ready for execution. However, as noted above, since staging area 420 can only hold a limited number of thread groups, some thread groups that are ready to issue may need to reside in pre-staging area 410 until other thread groups in staging area 420 issue. Additionally, some threads within staging area 420 may not be ready to execute per se, but may be imminently ready to compete with other threads for execution resources. At step 530, scheduler 400 allocates hardware resources 430 to the thread group. Those hardware resources may include instruction buffers implemented by flops, temporary registers, and other limited hardware resources associated with SM 310.

At step 540, scheduler 400 identifies a thread group based on the micro scheduling policy. The thread group identified at step 540 could be the thread group moved into staging area 420 at step 520, or could be another thread group already resident within staging area 420. At step 550, scheduler 400 issues the thread group identified at step 550 for execution on execution pipeline 440.

By scheduling thread groups for execution based on both a macro scheduling policy and a micro scheduling policy, scheduler 400 may efficiently allocate resources only to thread groups that are ready for execution or imminently ready to compete with other threads for execution resources. In addition, when selecting between thread groups that are ready for execution, scheduler 400 need only analyze a subset of all thread groups associated with SM 310, reducing the complexity of that selection process. Scheduler 400 may also implement the macro scheduling policy discussed herein to remove thread groups from staging area 420 and, in doing so, de-allocate hardware resources 430 from those thread groups, as described in greater detail below in conjunction with FIG. 6.

Figure 6:
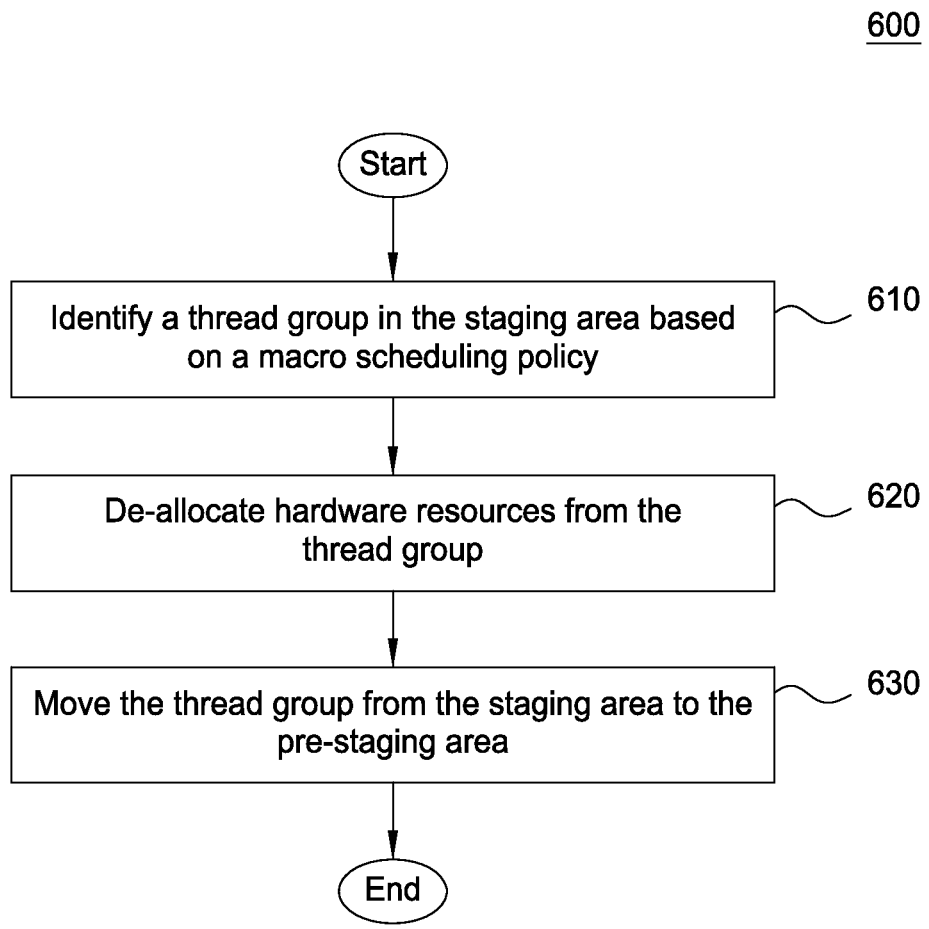
FIG. 6 is a flow diagram of method steps for de-allocating hardware resources from a group of threads, according to one embodiment of the present invention.

FIG. 6 is a flow diagram of method steps for de-allocating hardware resources from a group of threads, according to one embodiment of the present invention. The method steps may be performed, for example, when hardware resources have been allocated to a group of threads that cannot be scheduled for execution. Although the method steps are described in conjunction with the systems of FIGS. 1-4, persons skilled in the art will understand that any system configured to perform the method steps, in any order, is within the scope of the present invention.

As shown, a method 600 begins at step 610, where scheduler 400 identifies a thread group within staging area 420 based on the macro scheduling policy. Scheduler 400 may identify the thread group at step 610 as no longer being ready to issue instructions. Scheduler 400 could, for example, analyze dependencies associated with the thread group and determine that the thread group depends on a long-latency operation. Alternatively, scheduler 400 could determine that instructions associated with the thread group indicate that the thread group should yield hardware resources 430. In yet another alternative (among many possibilities), the macro-scheduler may make an attempt at fairness between thread groups by removing some threads from staging area 420 which have been resident for too long while others have been stuck waiting.

At step 620, scheduler 400 de-allocates hardware resources 430 from the identified thread group. Since the thread group is no longer ready to issue instructions for execution, the thread group need not retain access to hardware resources 430. At step 630, scheduler 400 moves the thread group from staging area 420 to pre-staging area 410. By implementing the method 600 in conjunction with the method 500 described above in conjunction with FIG. 5, scheduler 400 is configured to shuttle thread groups between pre-staging area 410 and staging area 420 continuously. In doing so, scheduler 400 may continuously allocate and de-allocate hardware resources 430 to various different thread groups, according to the macro scheduling policy.

In sum, a scheduler within a streaming multiprocessor is configured to arrange thread groups associated with the streaming multiprocessor into a pre-staging area and a staging area. The pre-staging area includes thread groups that may not yet be ready for execution, while the staging area may include thread groups that may be ready for execution. When the scheduler places a thread group into the staging area, the scheduler allocates hardware resources to that thread group. The scheduler is configured to select thread groups for execution from within the staging area. The selected thread groups execute using the allocated hardware resources.

Advantageously, the scheduler only allocates limited hardware resources to thread groups that are, in fact, ready to issue instructions, thereby efficiently conserving those resources. In addition, since the scheduler need only select a thread group to be issued from within a small subset of all thread groups, the scheduler need only be sized in proportion to the number of thread groups in that small subset in order to select thread groups from within that subset, thereby conserving area.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for scheduling a set of one or more threads for execution on a processing engine, the method comprising:
   identifying a first set of thread groups that includes thread groups determined to be stalled and not yet ready for execution on the processing engine;
   identifying a first thread group included in the first set of thread groups that is ready for execution on the processing engine;
   transferring the first thread group from the first set of thread groups to a second set of thread groups, wherein the second set of thread groups comprises thread groups ready for execution on the processing engine;
   transferring another thread group from the first set of thread groups to the second set of thread groups, the another thread group and the first thread group each including memory operations for a same target data;
   in response to determining that the another thread group and the first thread group does not include memory operations for the same target data, transferring the another thread group from the second set of thread groups to the first set of thread groups; and
   selecting, via a scheduler, the first thread group from the second set of thread groups for execution on the processing engine.

2. The computer-implemented method of claim 1, wherein identifying the first thread group comprises:
   analyzing a set of dependencies associated with the first thread group; and
   determining that the first thread group does not depend on any long-latency operations.

3. The computer-implemented method of claim 1, wherein identifying the first thread group comprises:
   analyzing a set of instructions associated with the first thread group; and
   determining that the set of instructions indicates that hardware resources should be allocated to the first thread group.

4. The computer-implemented method of claim 1, wherein identifying the first thread group comprises determining that the first thread group is coherent with another thread group in the first set or the second set.

5. The computer-implemented method of claim 1, further comprising:
   identifying a second thread group included in the second set of thread groups that is no longer ready for execution on the processing engine, wherein the second thread group includes one or more threads;
   de-allocating hardware resources previously allocated to the second thread group; and
   transferring the second thread group from the second set of thread groups to the first set of thread groups.

6. The computer-implemented method of claim 5, wherein identifying the second thread group comprises:
   analyzing a set of dependencies associated with the second thread group; and
   determining that the second thread group depends on one or more long-latency operations.

7. The computer-implemented method of claim 5, wherein identifying the second thread group comprises:
   analyzing a set of instructions associated with the second thread group; and
   determining that the set of instructions indicates that hardware resources should not be allocated any longer to the second thread group.

8. The computer-implemented method of claim 5, wherein identifying the second thread group comprises determining that the second thread group is not coherent with another thread group in the first set of thread groups or the second set of thread groups.

9. The computer-implemented method of claim 5, wherein identifying the second thread group comprises determining that the second thread group has been included in the second set for a threshold amount of time without progressing towards completion of a processing task.

10. The computer-implemented method of claim 1, wherein the second set of thread groups is less than the first set of thread groups.

11. The computer-implemented method of claim 1, wherein the second set of thread groups comprises a limited number of all thread groups associated with the processing engine.

12. The computer-implemented method of claim 1, further comprising, in response to transferring the first thread group to the second set of thread groups, allocating hardware resources to the first thread group, wherein hardware resources are allocated only to thread groups included in the second set of thread groups.

13. The computer-implemented method of claim 1, wherein the first thread group caches data required by the another thread group.

14. The computer-implemented method of claim 1, further comprising, before transferring the another thread group from the first set of thread groups to the second set of thread groups, determining that the another thread group and the first thread group each include memory operations for the same target data.

15. A subsystem configured to schedule a thread group for execution on a processing engine, including:
   a processor;
   a memory; and
   a scheduler configured to:

identify a first set of thread groups that includes thread groups determined to be stalled and not yet ready for execution on the processing engine;

identify a first thread group included in the first set of thread groups that is ready for execution on the processing engine;

transfer the first thread group from the first set of thread groups to a second set of thread groups, wherein the second set of thread groups comprises thread groups ready for execution on the processing engine;

transfer another thread group from the first set of thread groups to the second set of thread groups, the another thread group and the first thread group each including memory operations for a same target data;

in response to determining that the another thread group and the first thread group does not include memory operations for the same target data, transfer the another thread group from the second set of thread groups to the first set of thread groups; and select the first thread group from the second set of thread groups for execution on the processing engine.

16. The subsystem of claim 15, wherein the scheduler is configured to identify the first thread group by:

analyzing a set of dependencies associated with the first thread group; and determining that the first thread group does not depend on any long-latency operations.

17. The subsystem of claim 15, wherein the scheduler is configured to identify the first thread group by:

analyzing a set of instructions associated with the first thread group; and determining that the set of instructions indicates that hardware resources should be allocated to the first thread group.

18. The subsystem of claim 15, wherein the scheduler is configured to identify the first thread group by determining that the first thread group is coherent with another thread group in the first set or the second set.

19. The subsystem of claim 15, wherein the scheduler is further configured to:

identify a second thread group included in the second set of thread groups that is no longer ready for execution on the processing engine, wherein the second thread group includes one or more threads;

de-allocate hardware resources previously allocated to the second thread group; and transfer the second thread group from the second set of thread groups to the first set of thread groups.

20. The subsystem of claim 19, wherein the scheduler is configured to identify the second thread group by:

analyzing a set of dependencies associated with the second thread group; and determining that the second thread group depends on one or more long-latency operations.

21. The subsystem of claim 19, wherein the scheduler is configured to identify the second thread group by determining that the second thread group is not coherent with another thread group in the first set of thread groups or the second set of thread groups.

22. The subsystem of claim 19, wherein identifying the second thread group comprises determining that the second thread group has been included in the second set for a threshold amount of time without progressing towards completion of a processing task.

23. A computing device configured to schedule a thread group for execution on a processing engine, including:

a processor;

a memory; and a scheduler configured to:

identify a first set of thread groups that includes thread groups determined to be stalled and not yet ready for execution on the processing engine;

identify a first thread group included in the first set of thread groups that is ready for execution on the processing engine;

transfer the first thread group from the first set of thread groups to a second set of thread groups, wherein the second set of thread groups comprises thread groups ready for execution on the processing engine;

transfer another thread group from the first set of thread groups to the second set of thread groups, the another thread group and the first thread group each including memory operations for a same target data;

in response to determining that the another thread group and the first thread group does not include memory operations for the same target data, transfer the another thread group from the second set of thread groups to the first set of thread groups; and select the first thread group from the second set of thread groups for execution on the processing engine.

24. The computing device of claim 23, wherein the scheduler is further configured to:

identify a second thread group included in the second set of thread groups that is no longer ready for execution on the processing engine, wherein the second thread group includes one or more threads;

de-allocate hardware resources previously allocated to the second thread group; and transfer the second thread group from the second set of thread groups to the first set of thread groups.

* * * * *